United States Patent

Rentschler et al.

[15] 3,645,189

[45] Feb. 29, 1972

[54] FLASHGUNS

[72] Inventors: Waldemar T. Rentschler; Winfried Espig, both of Calmbach, Black Forest, Germany

[73] Assignee: Prontor-Werk Alfred Gauthier G.m.b.H., Calmbach, Black Forest, Germany

[22] Filed: Mar. 11, 1969

[21] Appl. No.: 806,161

[30] Foreign Application Priority Data

Mar. 14, 1968 Germany .....................P 16 22 941.7

[52] U.S. Cl. .............................95/11.5 R, 95/10 C, 95/53 E
[51] Int. Cl. .......................................................G03b 9/58
[58] Field of Search .................95/11.5, 11, 53 E, 31, 10 C; 240/1.3

[56] References Cited

UNITED STATES PATENTS 3,491,667  1/1970  Land..........................................95/11
3,245,332  4/1966  Kagan........................................95/53
3,349,678  10/1967  Suzuki et al...............................95/10 C
3,407,716  10/1968  Wick et al................................95/53 EB Primary Examiner—John M. Horan
Assistant Examiner—Robert P. Greiner
Attorney—March, Le Fever & Wyatt

[57] ABSTRACT

A flashgun using flashbulbs is provided for taking photographs by artificial light. The ignition of the flashbulb is initiated by the flash contact of the camera and an ignition circuit is connected to a primary coil of a transformer. The secondary coil of the transformer is connected to the firing circuit of a thyristor which on conduction energizes an electromagnet of a locking device for holding a shutter in front of the flashbulb in the open position. An electronic switching device including a photosensitive resistor controls a holding magnet cooperating with the drive of the shutter for releasing the shutter at the end of a time interval formed by the electronic switching device in order to allow the shutter to close.

7 Claims, 2 Drawing Figures

PATENTED FEB 29 1972

3,645,189

INVENTORS
Waldemar T. Rentschler
Winfried Espig
BY
March, Gillette & Wyatt
ATTORNEYS

FLASHGUNS

The invention relates to a flashgun using flashbulbs for making artificial light exposures.

The invention is more particularly concerned with a flashgun in which the flashbulb has a shutter between it and the object to be photographed, actuated means of a driving device, the shutter being open at the beginning of the combustion of the bulb to allow direct light irradiation of the object. The driving device is so controlled by means of an electronic switching device including a photosensitive resistor in its circuit, that the shutter closes after a time interval dependent on the intensity of the light reflected from the object. The advantage of this gun, compared with conventional flashguns, is that it is able automatically to shut off the light from the flashbulb before the ending of its actual lighting period, which in turn enables cumbersome and time-wasting setting operations to be dispensed with when taking photographs by flash light.

The present invention enables a flash gun of the kind referred, to be used in any camera fitted with X-contact, while at the same time ensuring that the correct light irradiation of the object occurs within a preselected exposure time interval of one-thirtieth sec., usual for flash exposures.

In accordance with the invention, the ignition of the flashbulb is initiated by the synchro-contact of the camera. In the ignition circuit of the bulb there is a primary coil of a transformer whose secondary coil is connected to the firing circuit of a thyristor. Firing of the thyristor energizes an electromagnet of a locking device which retains the shutter open against spring tension. An electronic device, including a photosensitive resistor, controls a holding magnet which cooperates with the drive of the shutter to release the latter at the end of a time interval formed by the switching device at the end of which the shutter closes. In this way, when taking flash photographs with a preset exposure time usual for this kind of photograph, it is ensured that, when the flashbulb is ignited by means of the X-contact normally provided in cameras, the light irradiation of the objects occurs within the preset exposure time. The simultaneous setting off of flashbulb and thyristor ensures that at the commencement of ignition of the flashbulb the electronic switching device is connected to potential and the mechanical locking device retaining the shutter in front of the flashbulb in the open position, is put out of action early enough to allow the electronic switching device to close the shutter after the correct time interval.

According to a feature of the invention, the locking device serving to keep the shutter open, cooperates directly with the shutter drive, or with a cocking member for moving it into the cocked position.

A further feature of the invention consists in that the armature of the holding magnet is arranged on an intermediate lever which in turn is mounted on a lever serving to drive the shutter, and is resiliently supported thereon. This provides a reliable abutment of the armature of the holding magnet, with simultaneous locking of the shutter. In order from a functional point of view to provide the most favorable conditions for the mechanical locking device, provision is made for the electromagnet to be formed as a tractor magnet.

Details of the invention are shown below with reference to a flashgun the shutter of which comprises two flaps. The invention is applicable also to flashguns which are provided with roller blind shutters, and/or which use flash cubes as the light source.

In the accompanying drawings.

In the Figures, 1″ denotes the housing of the flashgun, the electronic circuit of which is electrically connected by means of a cable 2″ and a plug 3″ with the synchronous contact $S_1$ of a camera. A lever 13″ which at one end is rotatably mounted and at the other end is adapted to be locked by an electromagnetic locking device against the action of a spring 15″ in the cocked position, is used to drive the shutter 7″, 8″, which consists of two rotatable flaps. The driving lever 13″ which is operationally connected via a pin and slot connection with the shutter 7″, 8″, is adapted to be moved into the cocked position by means of a press-button 22″ biased by a spring 23″. The electromagnetic locking device has an electromagnet 19″, an armature lever 20″, a catch spring 16″ and cooperating therewith a supporting spring 17″ moved by the armature lever 20″. The mechanical locking device formed by the two springs 16″ and 17″ may be replaced by an alternative locking device acting on the press-button 22″. It is essential that either device, when the armature lever 20″ is attracted by the electromagnet 19″ acting as a tractor magnet, should be instantly moved out of the locking position. For this purpose a locking device could also be provided which is associated directly with the shutter 7″, 8″, locking the latter mechanically after it has been moved into the open or cocked position. This open position is retained until the electronic circuit device, described in detail below, enables the shutter to return to the closed position, this being initiated by closure of the synchronous contact $S_1$.

Figure 1:
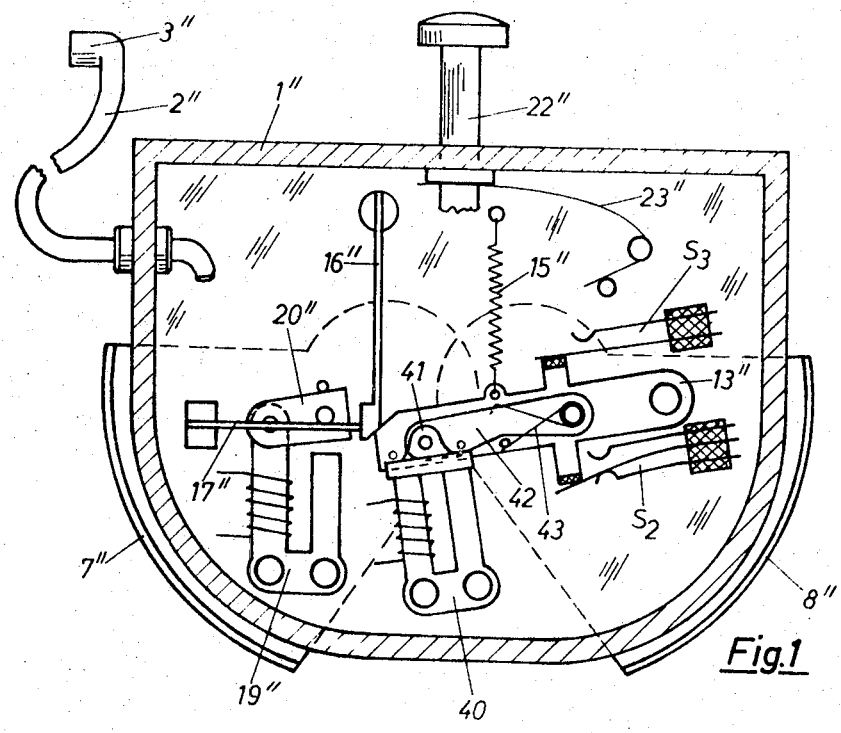
FIG. 1 shows a horizontal section of the flashgun in the cocked position.
Figure 2:
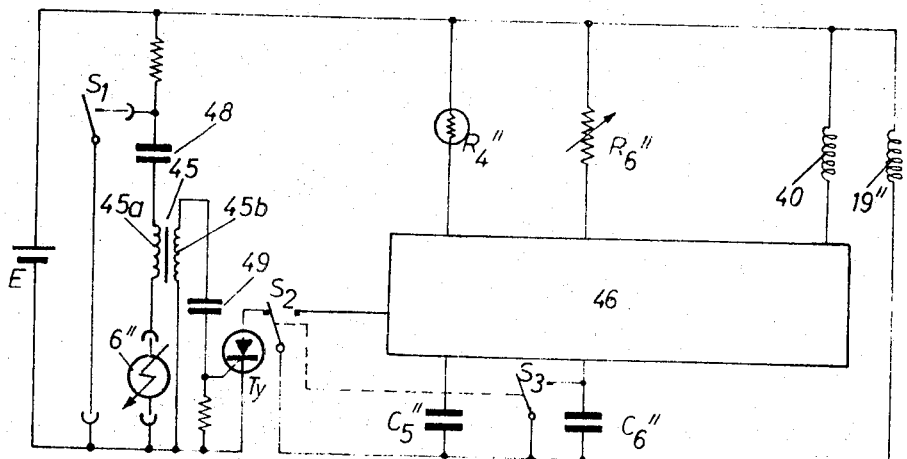
FIG. 2 is a circuit diagram of the electronic control for the flashgun.

As shown in FIG. 1, the driving lever 13″ has associated therewith an electromagnet 40, which is connected in the circuit device mentioned above. An armature 41 which is pivotably mounted by means of an intermediate lever 42 hingedly arranged on the driving lever 13″, cooperates with this electromagnet 40, formed as a holding magnet. This arrangement ensures that, when moving the driving lever 13″ which is positively connected with the shutter 7″, 8″ into the cocked position, the armature 41 is reliably abuted against the holding magnet before the locking of the shutter driving lever by the locking springs 16″ and 17″. As shown by the circuit diagram in FIG. 2, the circuit of an energy source or batter E has a transformer 45 connected therein, together with a synchronous or flash contact $S_1$ and the flashbulb 6″ of the flash gun. The primary coil 45a of the transformer is located in the ignition circuit of the bulb 6″, whilst the secondary coil 45b thereof is located in the firing circuit of a thyristor $Ty$. The numeral 46 denotes a known electronic timing circuit used to control the closing time of the shutter 7″, 8″ and which is energized when the thyristor $Ty$ fires. Simultaneously with the firing of the thyristor the tractor magnet 19″ is energized, disengaging the catch device formed by the two springs 16″ and 17″ blocking the shutter 7″, 8″ immediately the synchronous or flash contact $S_1$ closes. 48 is a flash capacitor, 49 is a control capacitor which is connected between the secondary coil 45b and the thyristor $Ty$. By means of switch $S_2$ which is connected with the RC networks of the electronic time control circuit 46, the capacitor $C_5″$, the photosensitive resistor $R_4″$ the capacitor $C_6″$ and the fixed resistor $R_6″$, a maximum predetermined timing of say one-thirtieth sec. for closing the shutter 7″, 8″, is determined. The switches $S_2$ and $S_3$ are coupled together as shown by the dotted line, and act to discharge the capacitor $C_5″$ and $C_6″$ during the transfer of the shutter 7″, 8″ to the closed position, for which purpose the two switches are arranged in the movement path of the driving lever 13″.

The flashgun described above operates as follows:

To carry out a flash exposure it is first necessary to connect the plug 3″ of the flashgun to the socket of the synchronous or flash contact provided on the camera, and to open the shutter itself by depressing the button 22″ into the cocked position shown in FIG. 1. When, on releasing the camera, its flash contact $S_1$ is actuated, flashbulb 6″ is ignited. With the ignition of the flashbulb 6″ a surge of current occurs in the secondary coil 45b of the transformer 45, which surge causes the thyristor $Ty$ to fire. This energizes the tractor magnet 19″, and the electronic time control circuit 46 is energized by switch $S_2$. The magnet 19″ instantly attracts the armature lever 20″ and thereby releases the catch springs 16″, 17″ blocking the shutter open. With the energizing of the attracting magnet 19″ a magnetic field also simultaneously builds up in the holding magnet 40, and the time control circuit 46 commences to function via the photosensitive resistor $R_4''$ by charging capacitor $C_5''$. Hence the driving lever 13" is held until the circuit 46 trips in dependence on the light incident on the photosensitive resistor $R_4''$. When this occurs, the magnetic field in the holding magnet 40 collapses, releasing the driving lever 13", which allows the shutter 7", 8" to close under the action of the tension spring 15". During the return movement of the driving lever 13", the two switches $S_2$ and $S_3$ are changed over. The changeover of switch $S_2$ interrupts the anode circuit of the thyristor $Ty$ thus extinguishing it, and the back contact of the switch $S_3$ applies a short circuit to the capacitors $C_5''$ and $C_6''$, resulting in their discharge.

The capacitor $C_6''$ and the resistor $R_6''$ are provided to bring about the closure of the shutter 7", 8" after a predetermined time interval of, for example, one-thirtieth sec. even if the light reflected by the object is so low that the electronic circuit 46 would not operate at all, or would operate only after a long time, measured from the ignition of the flashbulb 6".

This ensures that if the camera is hand held, the resulting photograph, even if underexposed, is not blurred by movement.

What we claim is:

1. A flashgun using flashbulbs for taking photographs by artificial light including ignition means for the flashbulb initiated by the flash contact of a camera, the ignition circuit for the flashbulb being connected to a primary coil of a transformer, a secondary coil of said transformer being connected in the firing circuit of a thyristor which on conduction, energizes an electromagnet of locking means for holding a shutter in front of a flashbulb in the open position, and electronic switching means including a photosensitive resistor which controls a holding magnet cooperating with drive means of the shutter to release said shutter at the end of a time interval formed by said electronic switching means to allow said shutter to close.

2. The flashgun according to claim 1, wherein said locking means serving to hold said shutter open is engageable with a drive member of said shutter.

3. The flashgun of claim 1 wherein said locking means serving to hold said shutter in the open position is engageable with a cocking member connected to said shutter for moving said shutter into the cocked position.

4. The flashgun of claim 3 wherein an armature cooperating with said holding magnet is arranged on an intermediate lever resiliently mounted on said cocking member, said cocking member being a pivotally mounted lever connected to said shutter for moving said shutter into the opened and closed position.

5. The flashgun of claim 4 wherein said electromagnet cooperating with said locking device is a tractor magnet.

6. A flashgun using flashbulbs for taking photographs by artificial light including circuit means for igniting the flashbulb by the flash contact of a cooperating camera, said circuit means having an ignition circuit for the flashbulb connected to the primary coil of a transformer, and a secondary coil of said transformer connected in the firing circuit of a thyristor, locking means having an electromagnet energized when said thyristor conducts, said locking means having spring members engageable with a drive member of shutter means for the flashbulb to hold said shutter means in the open position when said electromagnet is energized, electronic timing circuit means including a photosensitive resistor, said electronic timing circuit means controlling a holding magnet cooperating with said drive member of said shutter means to release said shutter means at the end of the time interval formed by said electronic timing circuit means.

7. The flashgun of claim 6 wherein an armature cooperating with said holding magnet is mounted on an intermediate lever, said intermediate lever being resiliently mounted on said drive member, and wherein said drive member is a spring-biased pivotally mounted lever connected to said shutter means for moving said shutter into the open and closed position.

* * * * *